Oct. 12, 1926.　　　　　　　　　　　　　　　　　　1,602,949
L. B. SCHUH ET AL
GATE AND ALARM SIGNAL
Filed Sept. 12 1924　　　　12 Sheets-Sheet 3
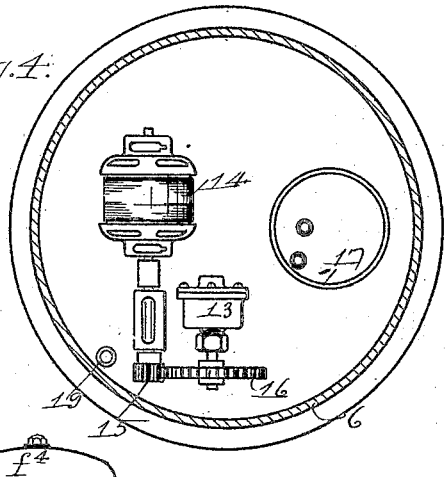
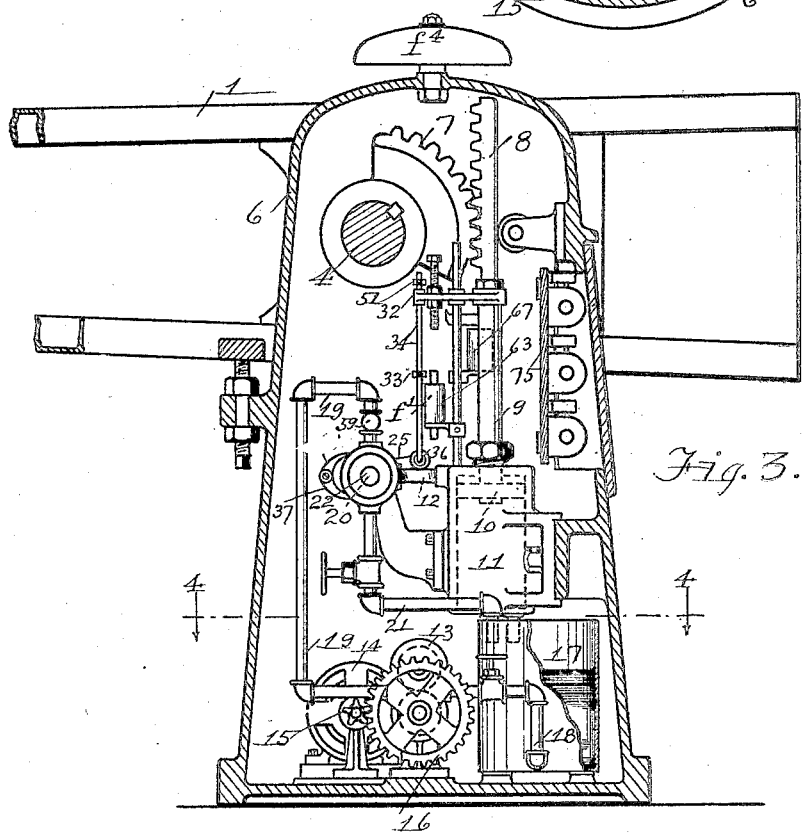

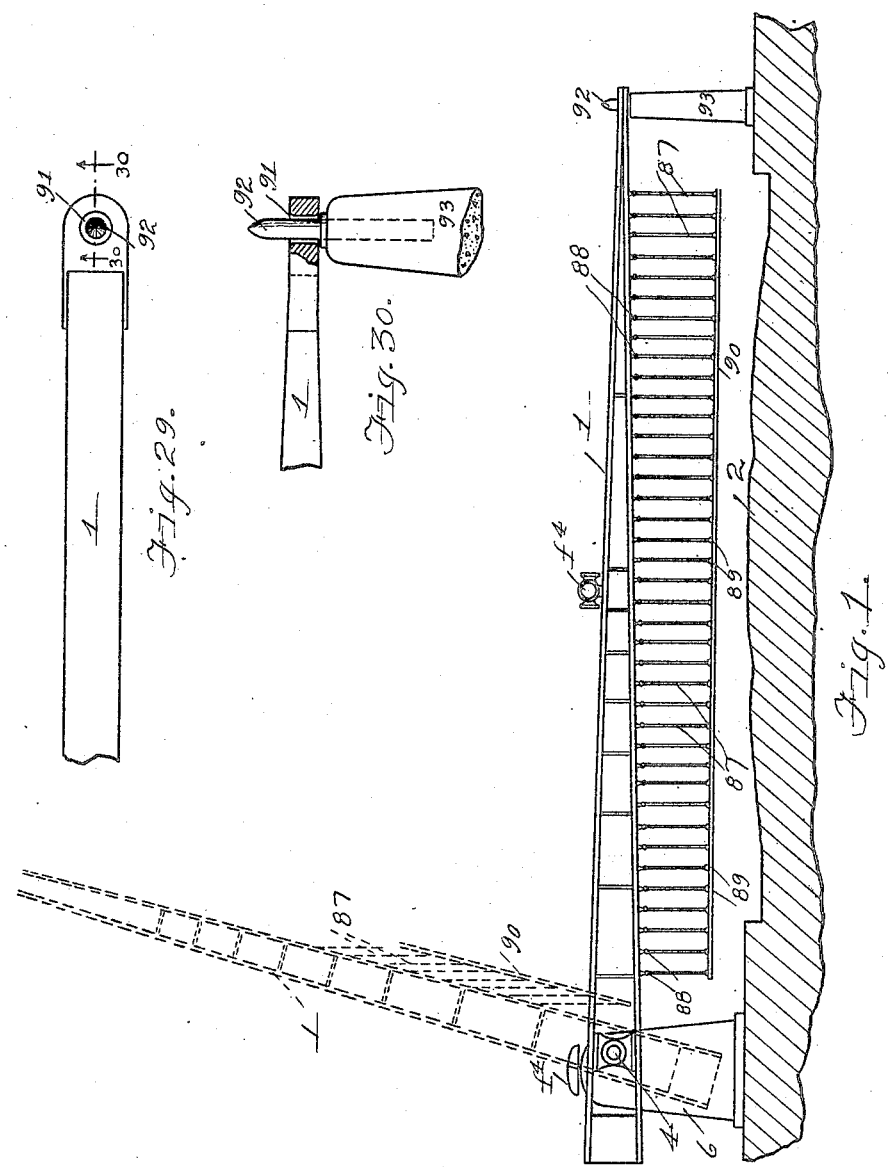

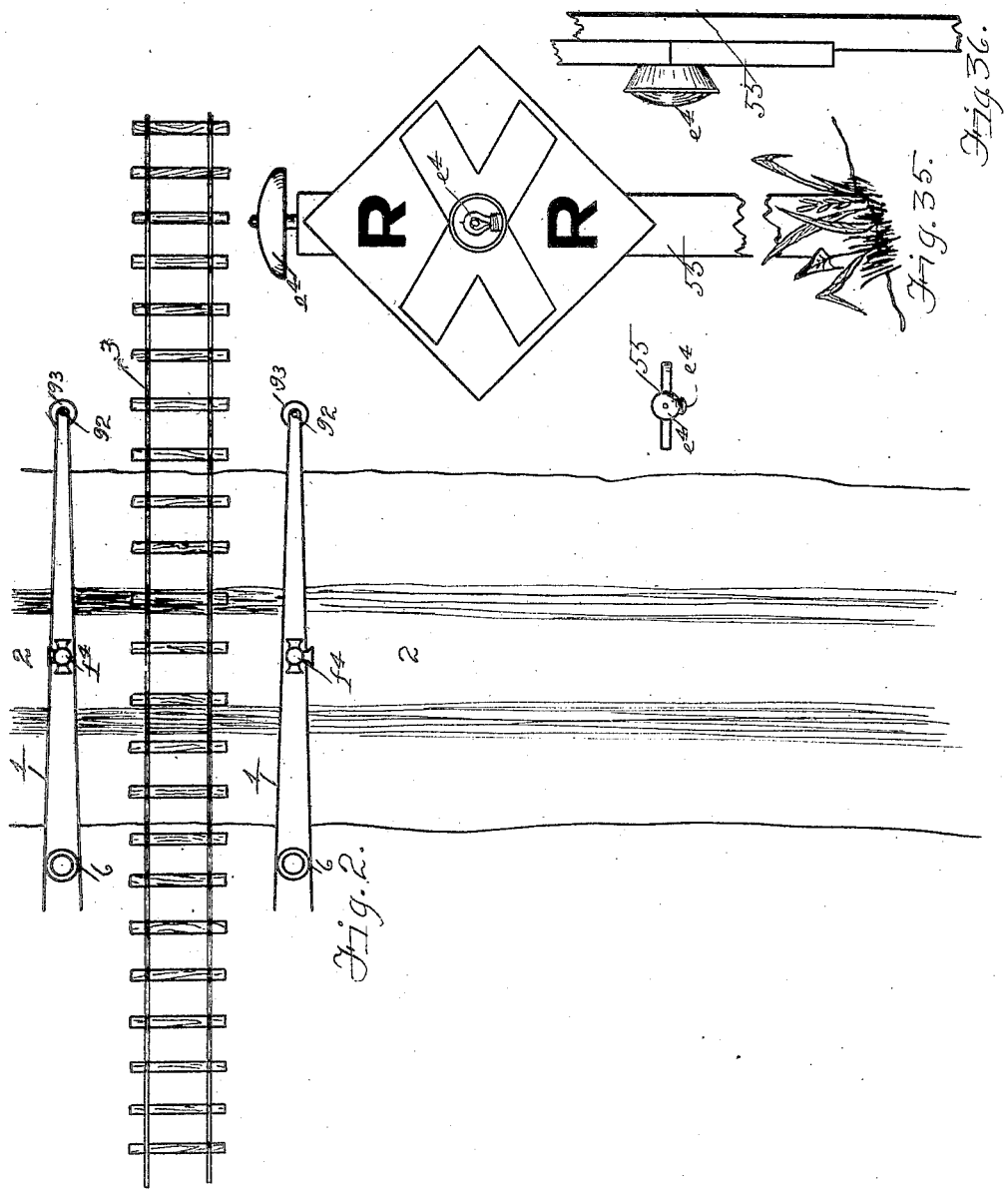

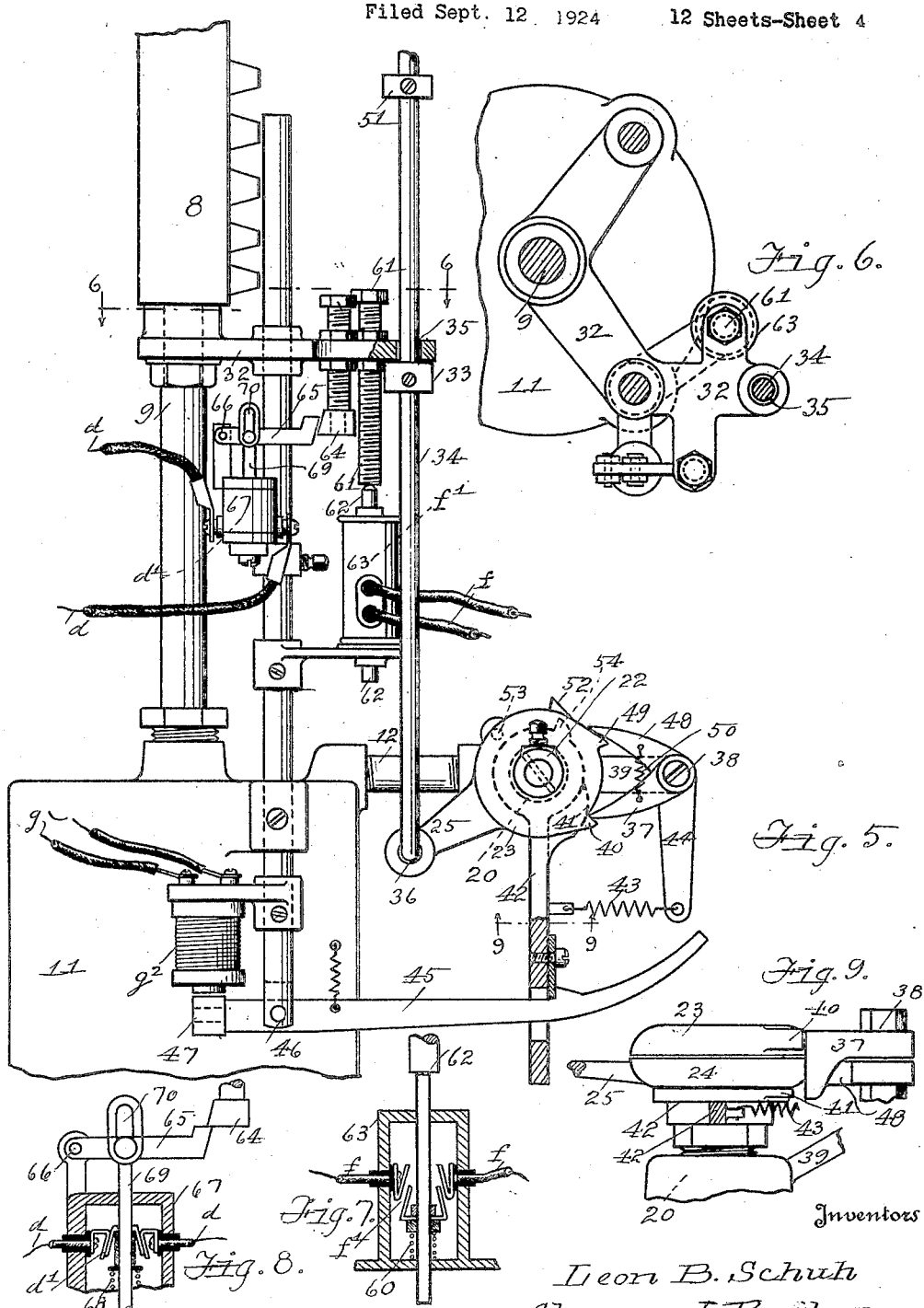

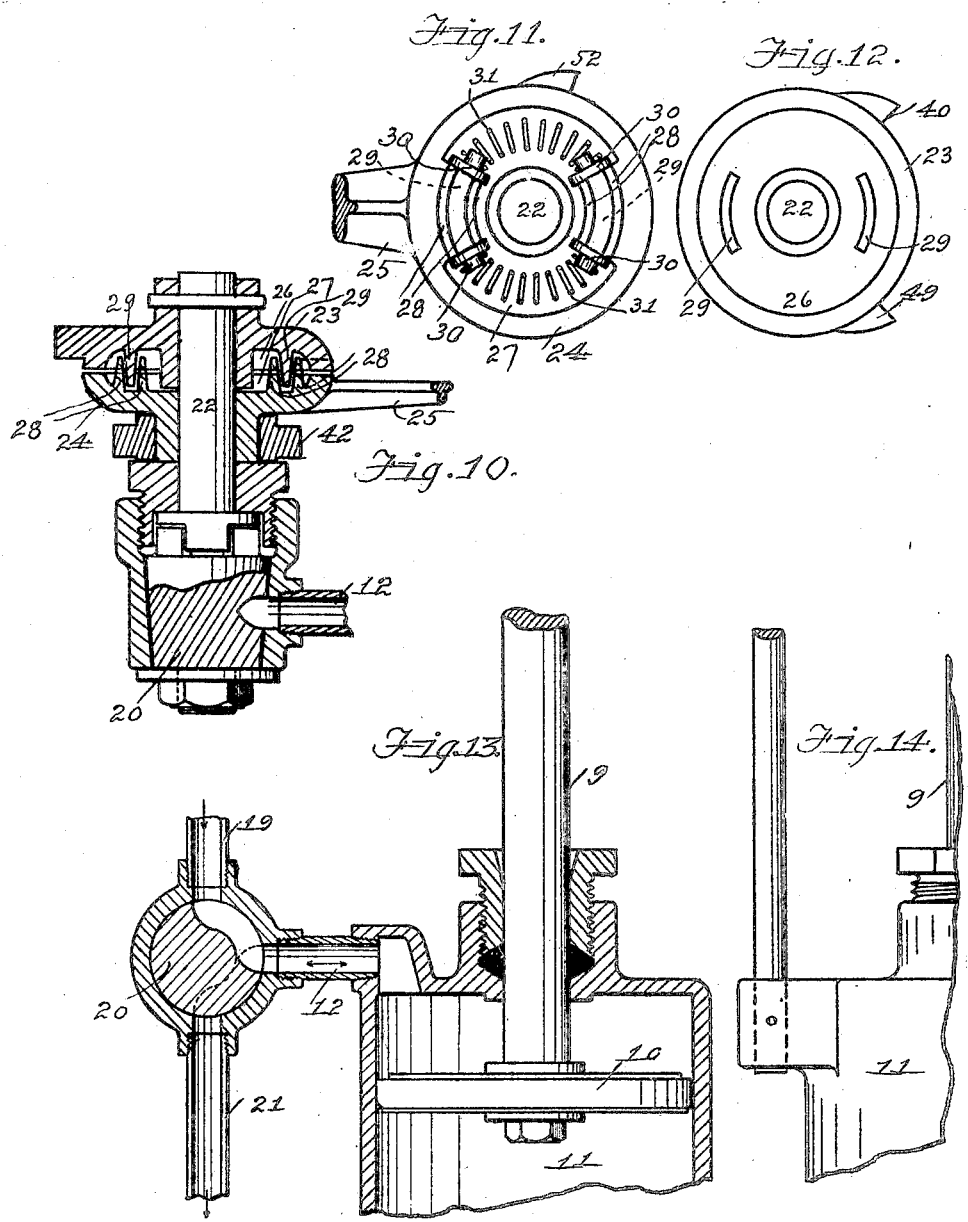

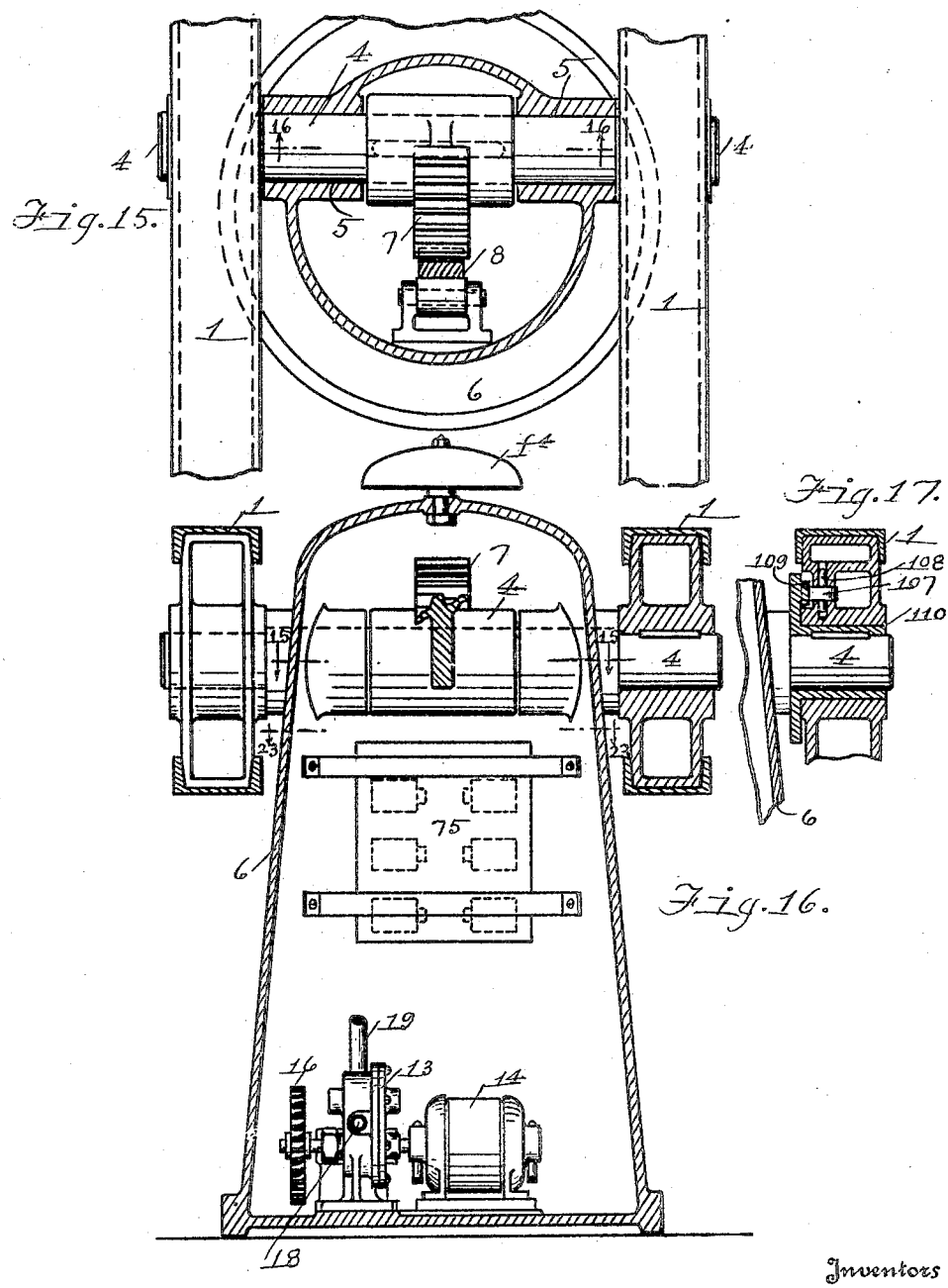

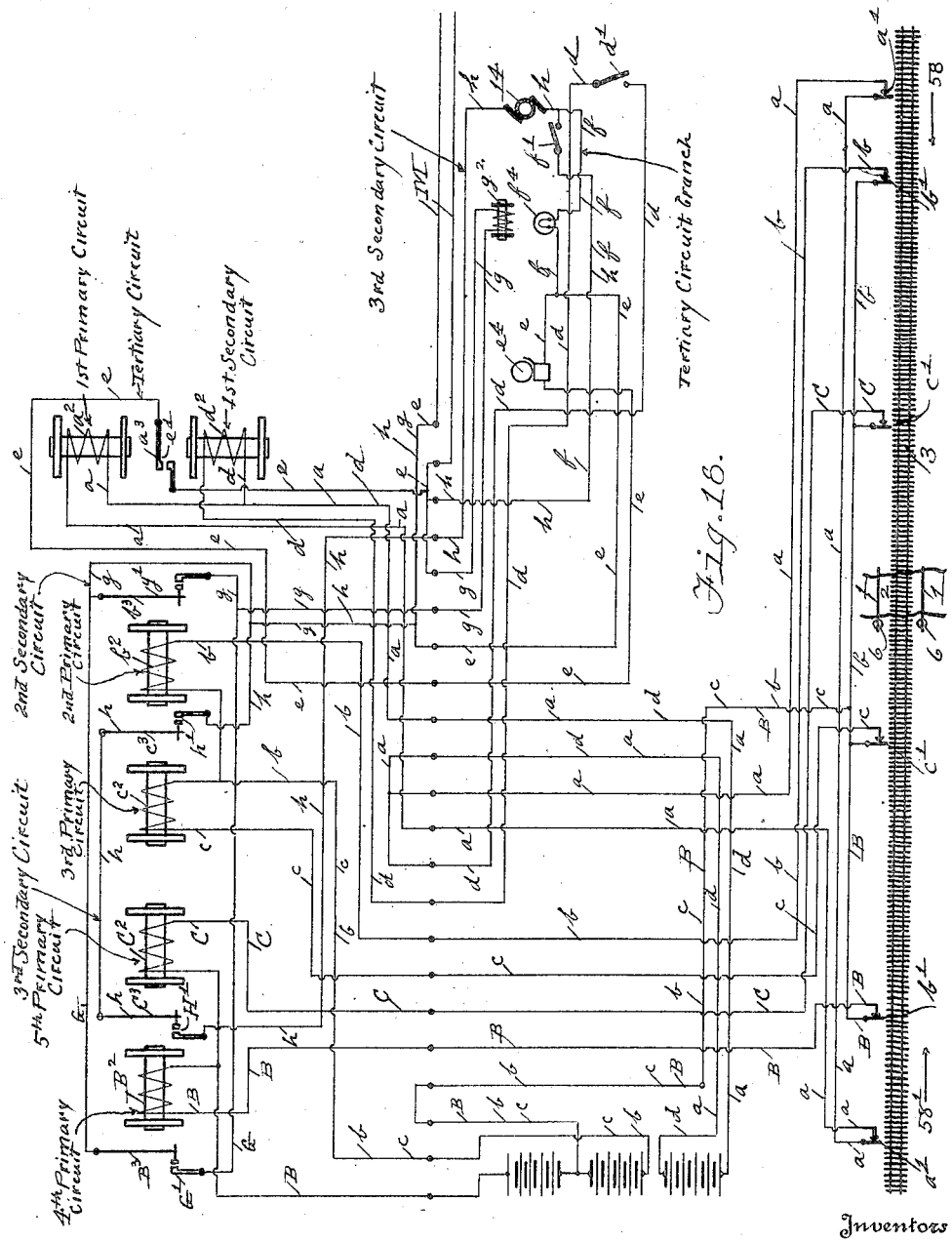

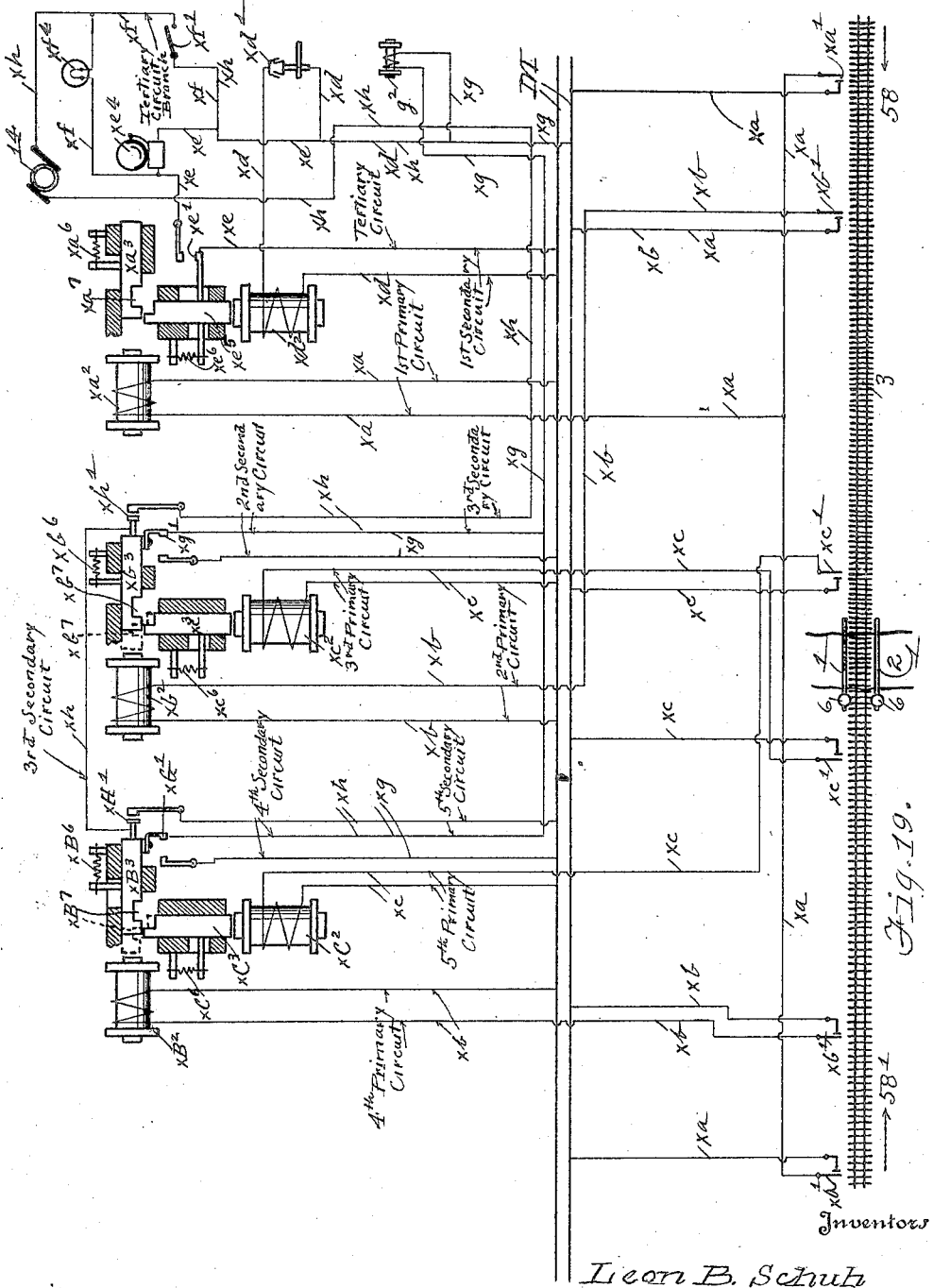

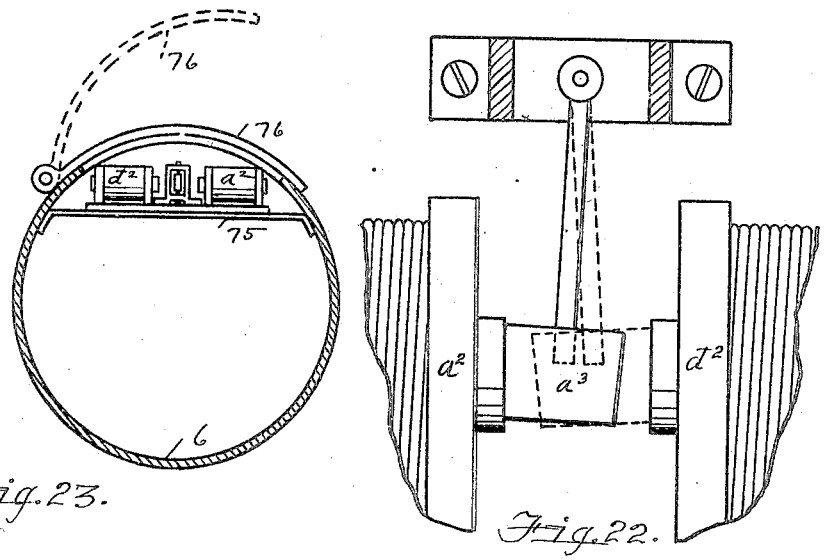
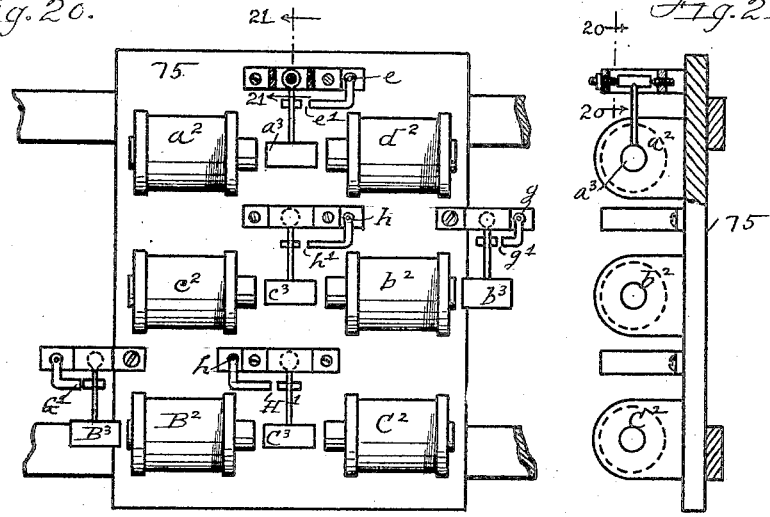

Oct. 12, 1926.

L. B. SCHUH ET AL 1,602,949

GATE AND ALARM SIGNAL

Filed Sept. 12 1924

Inventors
Leon B. Schuh
Clarence J. Bailey

Witness:
Geo. L. Chapel.

By Cyrus W. Rice
Attorney

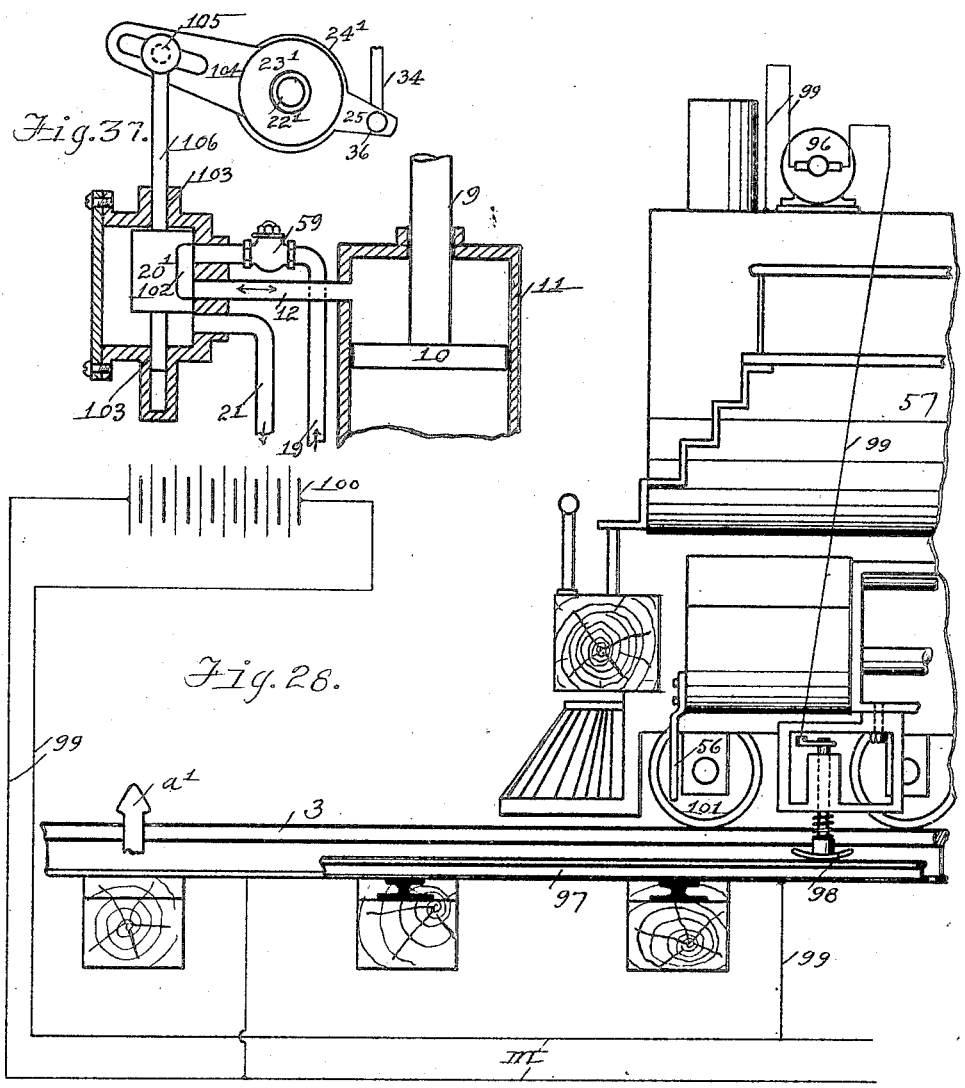

Oct. 12, 1926.
L. B. SCHUH ET AL
1,602,949
GATE AND ALARM SIGNAL
Filed Sept. 12 1924   12 Sheets-Sheet 12
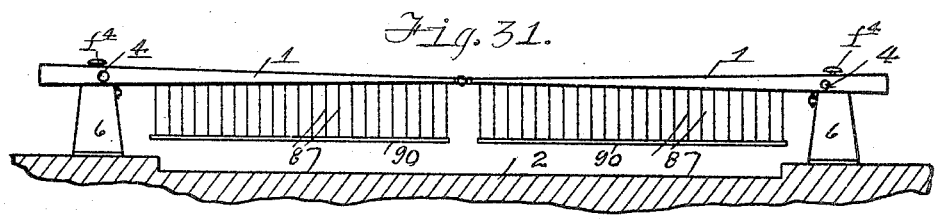
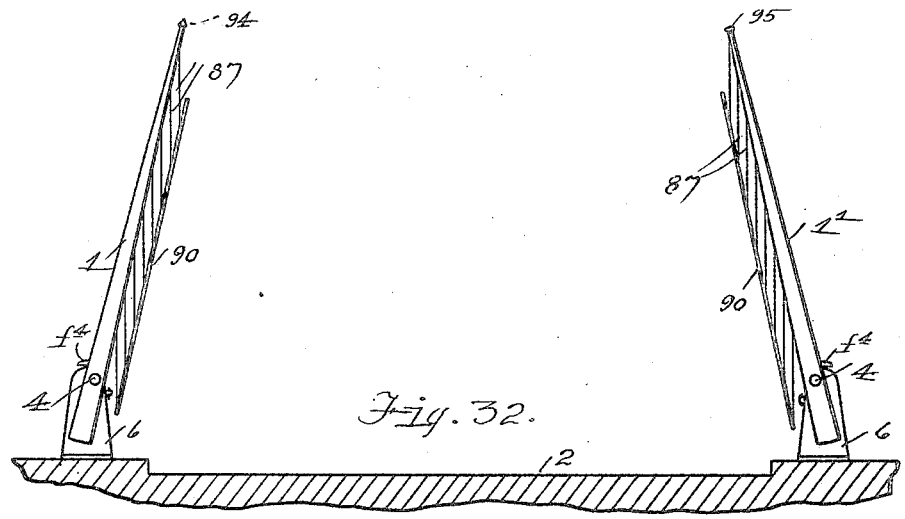
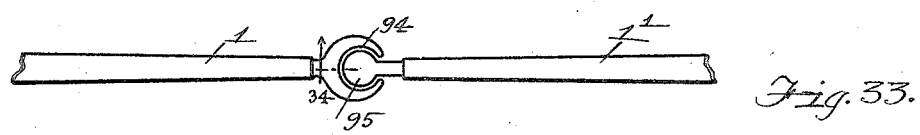
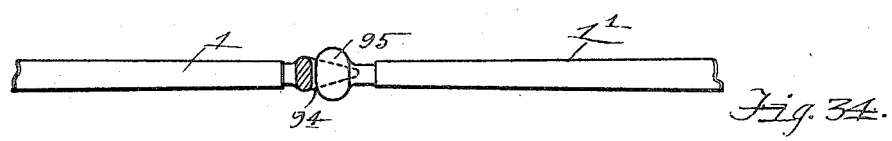
Inventor.
Leon B. Schuh
Clarence J. Bailey
By Cyrus W. Rice
Attorney Patented Oct. 12, 1926.

1,602,949

UNITED STATES PATENT OFFICE.

LEON B. SCHUH, OF WAYLAND, AND CLARENCE J. BAILEY, OF GRAND RAPIDS, MICHIGAN; SAID BAILEY ASSIGNOR TO DAVELETTA D. BAILEY, OF JACKSONVILLE, FLORIDA.

GATE AND ALARM SIGNAL.

Application filed September 12, 1924. Serial No. 737,238.

The present invention relates to gates and alarm signals; and its object is, generally, to provide an improved gate for closing a public highway at a railway crossing, and improved alarm signals indicating the near approach of trains thereto, and improved means for operating such gates and signals; and, more particularly, to provide such means electrically operated and actuated by the approaching and passing trains; and further, to provide improved specific parts of such gates, signals and means for thus operating the same.

These and any other objects hereinafter appearing are attained by, and the invention finds preferable embodiment in, the structure or structures, means and mechanisms, hereinafter particularly described in the body of this specification and illustrated by the accompanying drawings, in which:—

Figure 1 is a side elevation of a vertically swingable gate having alarm signals;

Figure 2 is a top plan view of a pair of such gates, the position, relatively thereto, of a post carrying additional alarm signals, being indicated on this view;

Figure 3 is a sectional view of the hollow supporting column of the gate, taken on a vertical plane perpendicular to the axis of the gate's swinging movement; and showing operating mechanism contained in the column;

Figure 4 is a transverse sectional view of the same taken on a horizontal plane corresponding to line 4—4 of Figure 3;

Figure 5 is a side elevation of portions of said operating mechanism, shown in a position other than that seen in Figure 3 and viewed from the opposite side;

Figure 6 is a transverse sectional view of parts of the same taken on horizontal planes corresponding to line 6—6 of Figure 5;

Figure 7 is a view of an electric-circuit closer and opener, showing the casing thereof (seen in Figure 5) in central vertical section;

Figure 8 is a view of another electric-circuit closer and opener, showing its casing (also seen in Figure 5) in central vertical section;

Figure 9 is an under side view of certain parts of the operating mechanism, shown partly in horizontal section taken on line 9—9 of Figure 5;

Figure 10 is an axial sectional view of parts seen in Figure 9;

Figure 11 is an inner side view of one of said parts;

Figure 12 is an inner side view of another of said parts;

Figure 13 is an axial sectional view of the upper portion of a cylinder having a piston, and a transaxial sectional view of the valve controlling the same;

Figure 14 is a side view of an upper portion of said cylinder viewed from another horizontal angle;

Figure 15 is a top plan view of a portion of the gate, its supporting hollow column being shown in horizontal section taken on line 15—15 of Figure 16;

Figure 16 is a vertical sectional view of the same taken on line 16—16 of Figure 15;

Figure 17 is a transverse sectional view of a part of the gate and adjacent parts, taken on the axis of the gate's swinging movement;

Figure 18 is a diagrammatic representation of electric circuits and instruments therein whereby the gate and alarm signal mechanisms may be operated from a normally closed electric circuit;

Figure 19 is a diagrammatic representation of electric circuits and instruments therein whereby said mechanisms may be operated from a normally open electric circuit;

Figure 20 is a face view of an instrument board having electro-magnets mounted thereon and contained in the gate's hollow supporting column, certain parts being shown in section taken on line 20—20 of Figure 21;

Figure 21 is a right-hand end view of the same, certain parts being shown in section taken on line 21—21 of Figure 20;

Figure 22 is an enlarged view of a pendulum-armature and electro-magnets;

Figure 23 is a transverse sectional view of the gate's supporting hollow column taken on line 23—23 of Figure 16 and showing said instrument board and instruments mounted thereon in top plan;

Figure 27 is a longitudinal central sectional view of a portion thereof;

Figure 28 is a side view of a railway track and electric circuit-carrying rail, and of a portion of a locomotive carrying a shoe contacting said rail, together with a diagrammatic representation of an electric circuit containing said shoe and other parts;

Figure 29 is a top plan view of the free end of the gate;

Figure 30 is a side view of the same and of a post engaged thereby in its closed position, the gate being shown partly in section taken on line 30—30 of Figure 29;

Figure 31 is a side view of a double gate in closed or lowered position;

Figure 32 is a like view of the same in raised or open position;

Figure 33 is a top plan view of the adjacent free ends of the two members of the closed double gate;

Figure 34 is a side view of the same, shown partially sectioned on line 34 of Figure 33;

Figure 35 is a face view of a post carrying a sign and alarm devices;

Figure 36 is a side view of the same; and

Figure 37 is a central longitudinal sectional view of a reciprocating valve, showing its operating mechanism.

Figures 25, 26:
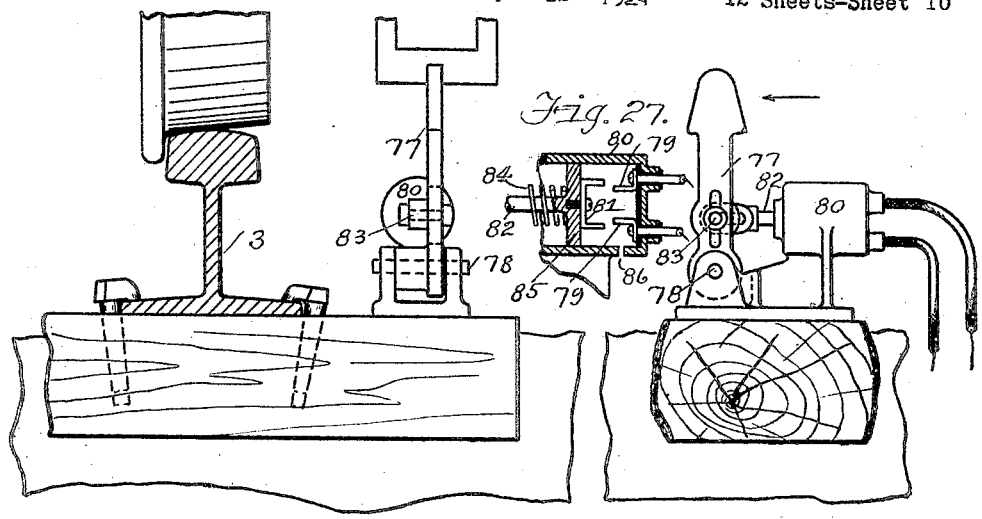
Figure 25 is a cross sectional view of said track and a front view of said electric-circuit closer and opener.
Figure 26 is a side view of said electric-circuit closer and opener.

In the embodiment of this invention chosen for illustration by the accompanying drawings and for detailed description in the body of this specification, a gate 1 shown in solid lines in its closed (lowered) position and in dotted lines in its open (raised) position in Figure 1, (a pair of such gates being shown in closed position in Figure 2) is employed to close the highway 2 adjacent the intersection thereof by the railway track 3. Each of these gates is swingable vertically to its said positions, being carried by a rock shaft 4 journalled at 5 on a hollow supporting column 6 which contains gate-operating and alarm-operating mechanism, as shown in Figure 3. Such mechanism, viewed from the opposite side, is also particularly shown in Figure 5, other views of the same or of parts and details thereof being seen in Figures 6, 7, 8, 9, 10, 11, 12 and 13. The gate's shaft 4 carries a toothed segment 7 with which meshes the toothed rack-portion 8 of a piston rod 9 whose piston-head 10 is moved downwardly in the cylinder 11 to raise (open) the gate. The piston rod with its rack is thus moved by the pressure of a suitable fluid, as oil, forced into the cylinder on the upper surface of the piston-head through a pipe 12, by means of a rotary pump indicated at 13 and operated by an electric motor indicated at 14, the gear 15 of whose shaft meshes with the gear 16 of the pump's shaft. The oil is drawn in such pumping operation from a tank 17 through a pipe 18 leading to the pump and is thence forced into the cylinder 11 through pipes 19 and 12, having a controlling rotary valve 20. When this valve (operated by means hereinafter explained) is turned to the position shown in solid lines in Figure 13, the oil may be pumped into the cylinder; but when the valve is turned to its other position indicated in dotted lines in Figure 13, the oil is permitted to flow out of the cylinder, through the pipes 12 and 21 and back into the tank 17, such flow of the oil being brought about by gravitation, which causes the gate to fall from its raised position, thus lifting the rack and piston-head.

In Figure 3 the parts are shown in the position they occupy when the gate is closed (lowered); while in Figure 5 said parts are shown in the position they assume when the gate is open (raised).

The rotary valve 20 has means for quickly turning it to either one of its positions, such means and the operation thereof being illustrated particularly in Figures 5, 9, 10, 11 and 12: This valve has a rock-shaft 22 coupled thereto (as shown in Figure 10) for turning it, this shaft being keyed to a disk 23. Turnably mounted on shaft 22 is a second disk 24 having an arm 25. These disks 23, 24 have circular recesses 26, 27 respectively in their adjacent sides, one disk (24) being provided with two pairs of arcuate parallel ribs 28, the other disk 23 having arcuate ribs 29 adapted to move (in the inter-relative turning movements of the two disks) parallel with and between the ribs 28 of the other disk. A pair of helical springs 31, arcuately disposed axially, are seated in said recesses and carry blocks 30 at their ends abutting, in the neutral position of the disks (illustrated in Figure 11), against the ends of all the ribs 28 and 29; but when these disks are turned in either direction about the axis of the shaft 22, these springs are compressed by the movement of the ends of the ribs 29 toward the ends of the ribs 28 at the opposite extremities of the respective springs.

Assuming now that the gate is closed (lowered) and the parts of the operating mechanism are in the positions seen in Figure 3: If the pump be now operated to raise the gate, the arm 32 carried by the piston-rod 9 will, in said rod's descending movement, strike an adjustable stop 33 on the vertical rod 34 (slidably bearing at 35 in arm 32) and move the rod 34 down with it. This rod 34, being pivotally connected at 36 to the arm 25 of the disk 24, will thus turn said disk about the shaft 22 (see Figures 3, 5 and 6). The detent 37, pivotally mounted at 38 on a stationary part 39 of the structure, engaging the ratchet tooth 40 of disk 23, holds this disk from turning with the said turning movement of the disk 24, so that the springs 31 are compressed by the downward movement of the rod 34. This compression continues and increases until the detent 40 is released from said tooth. Said detent is thus released, by the cam 41 of an arm 42, swingable on the shaft 22, said cam raising the extremity of said detent from the tooth 40 by the turning movement of said arm, under the action of the spring 43, toward the stationary leg 44 of the structure, such turning movement of said arm 42 occurring instantly it is released from its held engagement by the catch lever 45 fulcrumed at 46. This catch lever has an armature arm 47 attracted, to release the catch lever, by an electro-magnet $g^2$ energized through its electric circuit $g$, by means hereinafter explained. When the released arm 42 is pressed by spring 43 toward the right-hand side of Figure 5, said arm's cam 41 having released the detent 37, the disk 23 is pressed rotatably by the springs 31 to a position in which it is held against reverse movement by a second detent 48 engaging said disk's second ratchet tooth 49 and being pivotally mounted at 38 and spring-pressed at 50 toward the detent 37. The valve 20 being thus suddenly turned to open position, the oil is rapidly pumped into the cylinder on the upper surface of the piston-head to raise the gate to its open position. The springs are again compressed so that the valve 20 may suddenly turn to its other position to permit the oil to flow out of the cylinder (the pump's operation having been stopped), by the rising movement of the piston-rod 9, in the lowering of the gate, the arm 32 now striking the other adjustable stop 51 on the rod 34 and thus swinging the arm 25 upwardly to compress the springs 31. In this movement, the disk 23 is held by its tooth 49 and the detent 48 from turning with the disk 24, until the cam 52 of this disk raises the extremity of the detent 48 from the tooth 49, so that the springs 31 may expand and suddenly turn the valve to the position in which the weight of the descending gate forces the oil out of the cylinder. In this movement of the disk 24, its lug 53 strikes the lug 54 of the arm 42 and swings said arm, against the pressure of its spring 43, into its held engagement with the catch lever 45 as shown in Figure 5.

The motor 14 is operated and stopped, and suitable visible and audible alarm signals— as the lamps and bells $c^4$ and $f^4$ carried by the gate and its supporting column and by a post 55 located a proper distance from the gate—are operated through electric circuits and instruments therein controlled by trains approaching and passing the highway 2.

In the diagrammatic representation in Figure 18, normally closed electric circuits are opened by trains moving in either direction on the track 3. The circuit openers and closers, or "switches" in these circuits, operated by the trains, are located such a distance from the gate that the opening and closing of the gate and the operation of the signals may be properly timed relatively to the train's movements, and these circuit openers and closers (the construction of any one of which is particularly shown in Figures 24, 25, 26 and 27) are positioned at the side of the railway track 3 and at such distance therefrom that they may be operated by a projecting part 56 of a passing locomotive 57.

Referring now to diagrammatic Figure 18: The opening of either of the first circuit openers and closers or "switches" $a^2$ met by a train moving in the direction of either arrow 58 or $58^1$ operates the alarm signals; the next switch $b^1$ met by the train operates to close the gate; and the fourth switch $c^1$ met by the train (being the first switch met after crossing the highway 2) operates to raise the gate. It will thus be seen that only three of these switches—the first, second and fourth—met by a train moving in either direction are operated thereby, the three other switches only being operated by trains moving in the opposite direction. The electric circuit $a$, normally closed and opened by its switch $a^1$, contains the electro-magnet $a^2$ whose armature $a^3$ being released by opening said circuit is attracted by a magnet $d^2$ in a circuit $d$ normally closed by the switch $d^1$. This armature $a^3$ forms a switch $e^1$, and when released as aforesaid and attracted by magnet $d^2$ closes a circuit $e$ leading from the electric power line M (or other suitable source of electric energy) and containing the alarm signals $c^4$ on post 55 and operates the same. A branch $f$ of circuit $e$ contains the alarm signals $f^4$ on the gate or its supporting column, these signals $f^4$ being operated through circuits $e$ and $f$ providing the switch $f^1$ is closed. The gate being normally in open (raised) position, is held therein by the oil in the cylinder, the valve 20 being in the turned position shown in solid lines in Figure 13 and a check valve 59 in pipe 19 preventing the oil from flowing out from the cylinder, the pump, of course, not running. The train approaching the highway 2 and moving in the direction of arrow 58 next meets and opens the nearer switch $b^1$, in the closed circuit $b$, operating to lower the gate. This normally closed circuit $b$ contains an electro-magnet $b^2$, which being deenergized by opening said switch $b^1$ releases its armature $b^3$ which, forming also a switch $g^1$, swings by gravitation or other means to closed position, thus closing the circuit $g$ which contains the magnet $g^2$ which magnet, being thus energized, attracts its armature arm 47 and releases the catch lever 45 from the swingable arm 42, by whose swinging movement (hereinbefore explained) the springs 31 are allowed to expand and suddenly open the valve 20 to the dotted line position in Figure 13, so that the falling movement of the gate may now raise the piston head 10 and force the oil out of the cylinder 11.

In the falling movement of the gate and the rising movement of the piston rod 9, the circuit $f$ is closed by the spring 60 as soon as the screw 61 threaded for adjustment in the arm 32 of the piston rod is carried out of holding engagement with the upper end of the slidable plunger 62 carrying one of the contact points of switch $f^1$ in its casing 63 (see Figures 5 and 7). This circuit $f$ being now closed, operates the signals $f^4$ on the gate and its supporting column while the gate is down (closed); but when the gate is up (open) the screw 61 presses the plunger 62 down, opening the circuit $f$ and shutting off the signals $f^4$.

The switch $d^1$ when opened by the raising of the gate is opened only momentarily. As the piston rod 9 and its arm 32 descend, the striker 64 screw-threaded for adjustment in the arm 32 strikes the lever 65 fulcrumed at 66 on the casing 67 of switch $d^1$ and moves downwardly against the pressure of the spring 68 a plunger 69 slidable in said casing and carrying one of this switch's contact points; and when the striker 64 has passed out of contact with the plunger it rises and closes this switch again (see Figures 5 and 8). A slot 70 in the plunger permits the striker 64 in rising to swing the lever 65 upwardly without disturbing the closed switch $d^1$. This momentary opening of the switch $d^1$ and circuit $d$ deenergizes the magnet $d^2$ releasing the switch $e^1$—armature $a^3$ so that the magnet $a^2$ may now attract said switch-armature and open the circuit $e$ to shut off the signals $e^4$ on the post 55. Once these signals $e^4$ are thus shut off from operation (even momentarily) they continue to be so shut off, because the magnet $a^2$ when energized as it ordinarily is (being in the normally closed circuit $a$) has greater power to attract the armature $a^3$—switch $e^1$ than the magnet $d^2$ has power to attract it. Although the signals $e^4$ on the post 55 are thus shut off, the signals $f^4$ on the gate or its supporting column continue to operate until the switch $f^1$ is opened. It is desirable that these signals $f^1$ should thus continue in operation while the gate is closed in order that the engineer on the train may know that they are properly operating.

The motor 14 operated by an electric circuit $h$ is shut off from running by opening switch $f^1$. This circuit $h$ contains another switch $h^1$ which forms also an armature $c^3$.

The switch $f^1$ in this circuit $h$ is normally open, i. e. is open when the gate is raised or open, but is closed when the gate is lowered. When the train passing in the direction of arrow 58 has crossed the highway 2, it meets the switch $c^1$ just beyond and opens it and its normally closed circuit $c$, thus deenergizing the magnet $c^2$ in said circuit and thereby releasing the armature $c^3$—switch $h^1$ which now closes the circuit $h$ whereby the motor 14 begins to operate and raises the gate. When the armature $c^3$—switch $h^1$ is released by deenergizing the magnet $c^2$, it is attracted by the magnet $b^2$ in circuit $b$ (which is now closed, the train having passed the switch $b^1$), and the circuit $c$ is thus held closed until the gate has been raised by the motor to open the switch $f^1$; and the switch $h^1$ is thus held closed by the magnet $b^2$ until the next train moving in the direction of arrow 58 opens the switch $b^1$ thus deenergizing the magnet $b^2$ and permitting the then (and normally) energized magnet $c^2$ to swing the switch $h^1$—armature $c^3$ to open position in which it remains until the second-mentioned train meets and opens switch $c^1$. The two magnets $b^2$ and $c^2$ are so positioned relatively to the armature $c^3$ between them that this armature is more strongly attracted at any given time by that one of these two magnets toward which it is swung at that time.

Trains moving in the direction of the arrow $58^1$ on Figure 18 operate the switches $a^1$ and $b^1$ first met by it in the manner above described in the case of trains moving in the direction of arrow 58 and with the same results. As to the circuits operated by trains going in the direction of arrow $58^1$ and meeting the first switch $b^1$, the circuits and instruments therein operated by opening said switch are indicated on the drawings by the same reference characters (as in the case of trains moving in the direction of arrow 58) except that capital letters of reference instead of small letters are employed in some instances. The same employment of capital letters of reference as to certain circuits and instruments therein operated by opening the switch $c^1$ met and operated by trains moving in the direction of arrow $58^1$ is seen on the drawings.

It will be seen that the circuit $h$ contains the switch $H^1$—armature $C^3$ in addition to the switch $h^1$—armature $c^3$ and operating in the same manner and with the same effect. This provision is made for double-track railways and for the following purpose: When trains are passing the switches operated by them at the same time, one train on one track and the other on the other track, the first train to meet and open the switch $c^1$ on its track will not raise the gate until the other train has also met and opened its switch $c^1$ on its track; because, if the circuit $h$ is open at either switch $H^1$ or $h^1$, the motor will not be operated to raise the gate.

In the diagrammatic representation in Figure 19, normally open electric circuits are closed by the passing trains to operate the signals and to open and close the gate. In this Figure 19 electric circuits and instruments therein are, generally speaking, designated by the same reference letters and numerals, but with the letter $x$ prefixed thereto, as are used to designate the same or similar circuits and instruments in the diagrammatic representation in Figure 18.

In this Figure 19, a train moving in the direction of arrow 58 first meets and closes switch $xa^1$ thereby closing the normally open circuit $xa$ and energizing its magnet $xa^2$ which magnet thereupon attracts its sliding armature $xa^3$ against the pressure of a spring $xa^6$. A spring $xe^6$ presses a sliding armature-bolt $xe^5$ into a keeper notch $xa^7$ in armature $xa^3$, this armature-bolt $xe^5$ forming a switch $xe^1$ which now closes the circuit $xe$ in which is the signal $xe^4$ on the post 55, this signal now operating. A circuit $xf$ branches from circuit $xe$ and contains the signal $xf^4$ carried by the gate or its supporting column, this signal now operating provided the switch $xf^1$ in circuit $xf$ is closed by the closing of the gate, said switch $xf^1$ being open when the gate is raised. The switch $xd^1$ in the electrical arrangement shown in Figure 19 is normally open, but is closed momentarily by the raising movement of the gate, thus closing the circuit $xd$ momentarily and energizing the magnet $xd^2$ which now attracts its sliding armature-bolt $xe^5$, releasing the armature $xa^3$ and opening the switch $xe^1$ to cause the signals to cease operating.

As soon as the train passes switch $xa^1$ the circuit $xa$ again opens, and the train next meets and closes switch $xb^1$ and its normally open circuit $xb$ thus energizing its magnet $xb^2$ which now attracts its armature $xb^3$ against the pressure of a spring $xb^6$. This movement of armature $xb^3$ opens the switch $xh^1$ and its circuit $xh$ in which circuit are the signals $xf^4$, the motor 14 and the switch $xf^1$ normally open but closed by the closed gate. The switch $xg^1$ is closed by this movement of armature $xb^3$, thus closing the circuit $xg$ and energizing the magnet $g^2$ which now releases the swinging arm 42 and permits the springs 31 to expand and suddenly turn the valve 20 to allow the gate to fall. As soon as the train passes switch $xb^1$ it opens, thus deenergizing magnet $xb^2$ and releasing its armature $xb^3$; the spring $xc^6$ however, having moved armature-bolt $xc^3$ to the position indicated in dotted lines (in which it engages the keeper $xb^7$) holds armature $xb^3$ in the position indicated in dotted lines and holds open circuit $xh$ at the switch $xh^1$. The train next meets the switch $xc^1$ after crossing the highway 2 and closes it and the circuit $xc$, thus energizing the magnet $xc^2$ which now attracts the armature-bolt $xc^3$ releasing armature $xb^3$ and closing switch $xh^1$ and circuit $xh$ so that the motor 14 now operates to raise the gate.

Trains moving in the direction of arrow $58^1$ close the switches (at the left hand side of Figure 19) $xa^1$ to operate the signals and $xb^1$ to lower the gate, in the same manner and through the same circuits that trains moving in the direction of arrow 58 operate their corresponding switches; and trains moving in the direction of arrow $58^1$, after crossing the highway 2, operate switch $xc^1$ to raise the gate in like manner and with the same effect that oppositely moving trains operate their corresponding switch, the circuits and instruments therein operated by trains moving in the direction of arrow $58^1$ being designated, generally by capital letters instead of small letters.

It will be seen that magnetic energy in the arrangement shown in Figure 19 is derived from the electric power line M or from any other suitable source.

An instrument board 75 is desirably positioned inside the gate's supporting column 6 as shown in Figure 23, upon which board the magnets $a^2$, $b^2$, $c^2$, $d^2$, $B^2$, and $C^2$ with their armatures are mounted as seen in Figures 20 and 21, these instruments being readily accessible by opening the column's door 76; and the relative position of a pair of said magnets and their armature is shown in Figure 22.

Figure 24:
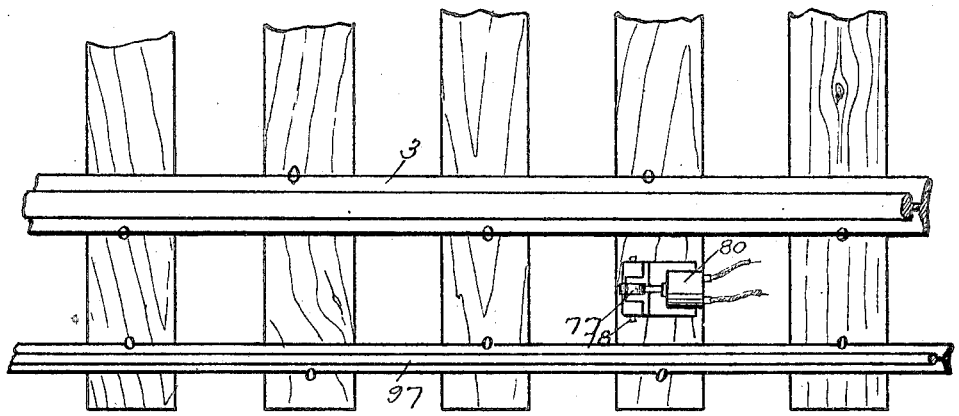
Figure 24 is a top plan view of a portion of a railway track having an electric-circuit-carrying rail paralleling the same, and showing an electric-circuit closer and opener mounted in connection therewith.

Any one of the switches, $a^1$, $b^1$ or $c^1$ indicated in Figures 18 and 19 is illustrated in Figures 24, 25 and 26. This switch comprises an arm 77 pivotally mounted at 78 and swingable from closed to open position, in these switches indicated in Figure 18, by a train moving in the direction of the arrow in Figure 26; but swingable oppositely, from open to closed position by the passing train, in these switches indicated in Figure 19. The contact points 79 of these switches are carried by the casing 80, the bridge 81 of the switch being carried by a plunger 82 slidable in bearings in the casing and connected at 83 to the arm 77. This plunger is spring-pressed at 84 to closed position in these switches indicated in Figure 18, and to open position in the switches indicated in Figure 19. When the passing train meets and by its projection 56 strikes the arm 77, it moves the plunger 82 to open the switch, in the diagrammatic representation in Figure 18, but to close it in the representation in Figure 19. To prevent the plunger from reacting too quickly under the pressure of the spring 84 after the train has passed, the plunger carries a piston head 85 slidably fitting in the casing, so that an air cushion or dash pot is formed between the piston head and the inner end of the casing, having a small vent 86.

The gate, shown in double form in Figures 31 and 32, has preferably a number of vertical pickets 87 pivotally mounted at 88 at their upper ends to the main member 1 of the gate, and pivotally connected at 89 at their lower ends to a bar 90, so that this bar and the pickets may assume by gravitation the positions shown in Figures 1, 31 and 32 when the gate is raised or lowered.

In a single gate, shown in Figures 1, 29 and 30, the free end of the gate is held against horizontal movement by being provided with a socket 91 in which engages a vertical pin 92 carried by a post 93 when the gate is lowered; and where a double gate (such as is shown in Figures 31, 32, 33 and 34) is provided, one member 1 of the double gate is provided at its free end with a socket 94 open above and below and having a slot at its outer side, while the other member 1¹ of the double gate has a knob 95 at its free end adapted to engage in this socket in the closing movement of said gate members.

In Figure 28 is shown an electric generator 96 mounted on a locomotive 57, an electric current-carrying rail 97 and a contact "shoe" 98 carried by the locomotive and pressing on said rail. Diagrammatically represented is the circuit 99 including the generator and grounded on the locomotive and connected with the shoe and thereby with the storage battery 100, the track rail 3, and a truck wheel 101 of the locomotive. Electricity developed by this generator and stored in said battery supplies energy to the branching power line M. In this view, the current-carrying rail 97 is shown lower than the track rail 3 merely for the sake of clearness.

The valve which controls the admission of oil to the cylinder 11 to raise the gate to open position may be of the rotary form hereinbefore described; or it may be a valve of other forms, such as the reciprocating valve 20¹ illustrated in Figure 37. This valve when raised to the position seen in said view, admits oil from the pump 13 through the pipe 19 into the valve's passage 102 and thence through the pipe 12 into the cylinder 11 and on the upper surface of the piston head 10 to raise the gate. When however this valve is lowered, the falling movement of the gate forces the oil reversely through the pipe 12, passage 102 and thence through the pipe 21 and into the tank 17. This valve is suddenly slid in bearings 103 in its casing to one or the other of its said positions by mechanisms similar to that employed, and hereinbefore described, for suddenly turning the rotary valve 20, viz.: The rod 34 is moved by the arm 32 of the piston rod 9, so that the disk 24¹ is turned by said rod, pivotally connected at 36 to the arm 25 of said disk, to compress the springs 31 held in recesses in said disk and in disk 23¹ having an arm 104 turnably connected at 105 to the stem 106 of the valve 20¹. These disks 23¹ and 24¹ turning interrelatively about an axis 22¹ are held to compress the springs 31 contained in their recesses, and are released to allow said springs to expand, by means identical with those employed for the same purposes in the construction hereinbefore explained and illustrated in Figures 5, 9, 10, 11 and 12, including the swingable arm 42, magnet $g^2$ and the catch-lever 45 for engaging and releasing said arm 42. The gate may be raised by hand from its closed position and held by hand in the position to which it has been thus raised. To this end, the gate is turnably mounted at 110 on its rock shaft 4 as shown in Figure 17, and is held against falling below its proper position when closed by a projection or lug (which may be in the form of a dog or pawl 107 turnably mounted at 108 on the gate) engaging a projection or lug 109 carried by the rock shaft.

Various devices, mechanisms, etc. illustrated by the drawings and hereinbefore described and their action explained, are capable of employment in connection with other parts and for other purposes than the operation of gates and alarm signals.

On Figures 18 and 19 of the drawings, the portions or circuits of the electric-circuit system operated by trains moving in the direction of the arrows 58 thereon, and certain portions or circuits of said system operated by trains moving in the direction of the arrows 58¹ or on another track, are not only identified by reference numerals and letters but also by words indicating the character of such portions or circuits.

The interlocking gates 1 and 1¹ shown in Figures 33 and 34, and the valve quick-operating mechanism shown in Figures 10, 11 and 12 are not claimed in the present application being reserved for separate applications.

The invention being intended to be pointed out in the claims, is not to be limited to or by details of construction or arrangement of the particular mechanical and electrical embodiment thereof illustrated by the drawings or hereinbefore described.

We claim:—

1. In an organization of the character described: a gate; mechanism for opening and closing the gate; a signal indicating the closing of the gate; an electric-circuit system having opening and closing switches adapted to be operated successively by a moving body and containing: electro-energized means controlled by the first of said switches for operating said signal; electro-energized means controlled by another of said switches, after the operation of said first switch, for discontinuing the operation of said signal; electro-energized means controlled by the second of said switches, after the operation of said first switch, for operating said mechanism to close the gate; electro-energized means controlled by the third of said switches, after the operation of said second switch, for operating said mechanism to open the gate; a second signal indicating the closing of the gate; an opening and closing switch in said system, operated by the gate's movement; electro-energized means in said system, controlled by the last-mentioned switch, for operating the second-mentioned signal.

2. In an organization of the character described: a gate, mechanism for opening and closing the gate; a signal indicating the closing of the gate; an electric-circuit system having opening and closing switches normally closed and adapted to be momentarily opened successively by a moving body, said system containing: electro-energized means controlled by the first of said switches for operating the signal; electro-energized means controlled by another of said switches, after the operation of the first switch, for discontinuing the operation of said signal; electro-energized means controlled by the second of said switches, after the operation of the first switch, for operating said mechanism to close the gate; electro-energized means controlled by the third of said switches, after said operation of second switch, for operating said mechanism to open the gate.

3. In an organization of the character described: a gate; mechanism for opening and closing the gate; a signal indicating the closing of the gate; an electric-circuit system comprising: primary circuits having opening and closing switches adapted to be operated successively by a moving body; secondary electric circuits having opening and closing devices controlled by said switches; a tertiary circuit opened and closed by one of said devices, said circuits containing: electro-energized means, controlled by the first of said switches, for operating said signal; electro-energized means, controlled by another of said switches for discontinuing the operation of said signal; electro-energized means, controlled by the second of said switches, for operating said mechanism to close the gate; electro-energized means, controlled by the third of said switches for operating said mechanism to open the gate.

4. In an organization of the character described: a gate; mechanism for opening and closing the gate; a signal indicating the closing of the gate; an electric-circuit system comprising: primary circuits having opening and closing switches adapted to be operated successively by a moving body; secondary electric circuits having opening and closing devices controlled by said switches, a tertiary circuit opened and closed by one of said devices; said circuits containing: electro-energized means, controlled by the first of said switches, for operating said signal; electro-energized means, controlled by another of said switches, for discontinuing the operation of said signal; electro-energized means, controlled by the second of said switches, for operating said mechanism to close the gate; electro-energized means, controlled by the third of said switches for operating said mechanism to open the gate; a second signal indicating the closing of the gate; a branch of the tertiary circuit containing the means for operating the first-mentioned signal, said branch containing electro-energized means for operating the second signal and having an opening and closing switch operated by the gate's movement.

5. In an organization of the character described; a gate; mechanism for opening the gate; mechanism for holding the gate open; a signal for indicating the closing of the gate; first, second and third primary electric circuits containing electro-magnets and having opening and closing switches normally closed but adapted to be momentarily opened successively by a moving body; a first secondary electric circuit containing an electro-magnet and having an opening and closing switch normally closed but momentarily opened by the opening movement of the gate; a tertiary electric circuit containing electro-energized means for operating said signal and having an opening and closing switch forming the armature of the magnets in the first primary circuit and first secondary circuit hereinafter mentioned and attracted by the former to open and by the latter to closed position; a second secondary electric circuit containing electro-energized means for releasing the mechanism for holding the gate open and having an opening and closing switch forming the armature of the magnet in the second primary circuit and attracted by said magnet to open position; a third secondary electric circuit containing electro-energized means for operating the mechanism for opening the gate and having an opening and closing switch open in the opened position of the gate and closed in the gate's closed position, and having also a second opening and closing-switch forming the armature of the magnets in the second and third primary circuits and attracted by the former to closed and by the latter to open position; the said armatures common to two magnets and having been attracted to one of them, remaining attracted thereto until the same is deenergized.

6. In an organization of the character described: a gate; mechanism for opening the gate; mechanism for holding the gate open; a signal for indicating the closing of the gate; first, second and third primary electric circuits containing electro-magnets and having opening and closing switches normally closed but adapted to be momentarily opened successively by a moving body; a first secondary electric circuit containing an electro-magnet and having an opening and closing switch normally closed but momentarily opened by the opening movement of the gate; a tertiary electric circuit containing electro-energized means for operating said signal and having an opening and closing switch forming the armature of the magnets in the first primary circuit and first secondary circuit hereinafter mentioned and attracted by the former to open and by the latter to closed position; a second secondary electric circuit containing electro-energized means for releasing the mechanism for holding the gate open and having an opening and closing switch forming the armature of the magnet in the second primary circuit and attracted by said magnet to open position; a third secondary electric circuit containing electro-energized means for operating the mechanism for opening the gate and having an opening and closing switch open in the opened position of the gate and closed in the gate's closed position, and having also a second opening and closing switch forming the armature of the magnets in the second and third primary circuits and attracted by the former to closed and by the latter to open position; a second signal for indicating the closing of the gate; a branch of the tertiary circuit having an opening and closing switch open in the opened position of the gate and closed in the gate's closed position; said branch containing electro-energized means for operating said second signal; the said armatures common to two magnets and having been attracted to one of them, remaining attracted thereto until the same is deenergized.

7. In an organization of the character described: a gate; mechanism for opening the gate; mechanism for holding the gate open; a signal for indicating the closing of the gate; first, second and third primary electric circuits containing electro-magnets and having opening and closing switches normally closed but adapted to be momentarily opened successively by a moving body; a first secondary electric circuit containing an electro-magnet and having an opening and closing switch normally closed but momentarily opened by the opening movement of the gate; a tertiary electric circuit containing electro-energized means for operating said signal and having an opening and closing switch forming the armature of the magnet in the first primary circuit and attracted thereby to open position; a second secondary electric circuit containing electro-energized means for releasing the mechanism for holding the gate open, and having an opening and closing switch forming the armature of the magnet in the second primary circuit and attracted thereby to open position; a third secondary electric circuit containing electro-energized means for operating the mechanism for opening the gate and having an opening and closing switch open in the opened position of the gate and closed in the gate's closed position, and having also a second opening and closing switch forming the armature of the magnet in the third primary circuit and attracted thereby to open position.

8. In an organization of the character described: a gate; mechanism for opening the gate; mechanism for holding the gate open; a signal for indicating the closing of the gate; first, second and third primary electric circuits containing electro-magnets and having opening and closing switches normally closed but adapted to be momentarily opened successively by a moving body; a first secondary electric circuit containing an electro-magnet and having an opening and closing switch normally closed but momentarily opened by the opening movement of the gate; a tertiary electric circuit containing electro-energized means for operating said signal and having an opening and closing switch forming the armature of the magnet in the first primary circuit and attracted thereby to open position; a second secondary electric circuit containing electro-energized means for releasing the mechanism for holding the gate open, and having an opening and closing switch forming the armature of the magnet in the second primary circuit and attracted thereby to open position; a third secondary electric circuit containing electro-energized means for operating the mechanism for opening the gate and having an opening and closing switch open in the opened position of the gate and closed in the gate's closed position, and having also a second opening and closing switch forming the armature of the magnet in the third primary circuit and attracted thereby to open position; a second signal for indicating the closing of the gate; a branch of the tertiary circuit having an opening and closing switch open in the opened position of the gate and closed in the gate's closed position, said branch containing electro-energized means for operating said second signal.

9. In an organization of the character described: a gate; mechanism for opening the gate; mechanism for holding the gate open; a signal for indicating the closing of the gate; first, second and third primary electric circuits containing electro-magnets and having opening and closing switches normally closed but adapted to be momentarily opened successively by a moving body; a first secondary electric circuit containng an electromagnet and having an opening and closing switch normally closed but momentarily opened by the opening movement of the gate; a tertiary electric circuit containing electro-energized means for operating said signal and having an opening and closing switch forming the armature of the magnets in the first primary circuit and first secondary circuit hereinafter mentioned and attracted by the former to open and by the latter to closed position; a second secondary electric circuit containing electro-energized means for releasing the mechanism for holding the gate open and having an opening and closing switch forming the armature of the magnet in the second primary circuit and attracted by said magnet to open position; a third secondary electric circuit containing electro-energized means for operating the mechanism for opening the gate and having an opening and closing switch open in the opened position of the gate and closed in the gate's closed position, and having also a second opening and closing switch forming the armature of the magnets in the second and third primary circuits and attracted by the former to closed and by the latter to open position; fourth and fifth primary electric circuits containing electro-magnets and having opening and closing switches normally closed but adapted to be momentarily opened successively by a moving body; an additional opening and closing switch in the third secondary circuit forming the armature of the magnets in the fourth and fifth primary circuits and attracted by the former to closed and by the latter to open position; the said armatures common to two magnets and having been attracted to one of them, remaining attracted thereto until the same is deenergized.

10. In an organization of the character described; a gate; mechanism for opening the gate; mechanism for holding the gate open; a signal for indicating the closing of the gate; first, second and third primary electric circuits containing electro-magnets and having opening and closing switches normally closed but adapted to be momentarily opened successively by a moving body; a first secondary electric circuit containing an electro-magnet and having an opening and closing switch normally closed but momentarily opened by the opening movement of the gate; a tertiary electric circuit containing electro-energized means for operating said signal and having an opening and closing switch forming the armature of the magnet in the first primary circuit and attracted thereby to open position; a second secondary electric circuit containing electro-energized means for releasing the mechanism for holding the gate open, and having an opening and closing switch forming the armature of the magnet in the second primary circuit and attracted thereby to open position; a third secondary electric circuit containing electro-energized means for operating the mechanism for opening the gate and having an opening and closing switch open in the opened position of the gate and closed in the gate's closed position, and having also a second opening and closing switch forming the armature of the magnet in the third primary circuit and attracted thereby to open position; a fourth primary electric circuit containing an electro-magnet and having an opening and closing switch normally closed but adapted to be momentarily opened by a moving body; an additional opening and closing switch in the third secondary circuit forming the armature of the magnet in the fourth primary circuit and attracted thereby to closed position.

In testimony whereof we have hereunto set our hands.

LEON B. SCHUH.
CLARENCE J. BAILEY.